United States Patent
Jung et al.

(10) Patent No.: US 7,576,785 B2
(45) Date of Patent: Aug. 18, 2009

(54) APPARATUS AND METHOD FOR COMPENSATING FOR BACKLIGHT IN A MOBILE TERMINAL WITH A CAMERA

(75) Inventors: Jee-Young Jung, Busan (KR); Jae-Ik Jung, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 725 days.

(21) Appl. No.: 10/847,470

(22) Filed: May 18, 2004

(65) Prior Publication Data

US 2004/0233321 A1    Nov. 25, 2004

(30) Foreign Application Priority Data

May 24, 2003   (KR)   ............... 10-2003-0033196

(51) Int. Cl.
*H04N 9/73*    (2006.01)
(52) U.S. Cl. .................... 348/227.1; 348/362
(58) Field of Classification Search ............ 348/227.1, 348/371, 207.99, 229.1, 370, 366, 234, 374, 348/364, 363, 362, 228.1, 225.1, 226.1, 224.1, 348/223.1, 222.1; 396/234, 128
See application file for complete search history.

(56) References Cited

U.S. PATENT DOCUMENTS

| 6,301,440 | B1 * | 10/2001 | Bolle et al. | 396/128 |
| 6,930,718 | B2 * | 8/2005 | Parulski et al. | 348/333.11 |
| 7,394,489 | B2 * | 7/2008 | Yagi | 348/227.1 |
| 2001/0055987 | A1 * | 12/2001 | Tsuchida | 455/575 |
| 2005/0253923 | A1 * | 11/2005 | Komori et al. | 348/14.02 |

FOREIGN PATENT DOCUMENTS

JP    11046367 A    *    2/1999

* cited by examiner

*Primary Examiner*—Lin Ye
*Assistant Examiner*—Nelson D. Hernández Hernández
(74) *Attorney, Agent, or Firm*—Roylance, Abrams, Berdo & Goodman, L.L.P.

(57) ABSTRACT

An apparatus and method for compensating for backlight in a mobile terminal with a camera, which includes a camera unit having a camera lens and an ultraviolet sensor, which are disposed adjacent to each other and oriented in a same direction; and a control unit for generating a photographing control signal when a photographing mode key is input and controlling compensation for backlight while in the photographing mode.

10 Claims, 11 Drawing Sheets

APPARATUS AND METHOD FOR COMPENSATING FOR BACKLIGHT IN A MOBILE TERMINAL WITH A CAMERA

PRIORITY

This application claims the benefit under 35 U.S.C. § 119 (a) of an application entitled "Apparatus and method for compensating for backlight in mobile terminal with camera" filed in the Korean Intellectual Property Office on May 24, 2003 and assigned Serial No. 2003-33196, the entire contents of which are incorporated herein by reference.

BACKGROUND OF THE INVENTION

1. Field of the Invention

The present invention relates to a mobile terminal. In particular, the present invention relates to an apparatus and a method for compensating for backlight in a mobile terminal with a camera.

2. Description of the Related Art

Mobile phones allow communication with other persons via various functions including text messaging function. Mobile phones also incorporate a camera function for performing a general camera function. Further, small and light weight mobile phones having a camera function are preferred over a heavy general camera.

When a user photographs an object using a mobile phone with a camera, the object may be backlight-photographed by the camera. Backlight means that the object is positioned with a light source behind it, and a photographer photographs the object with the light source behind the object. Since the camera faces the light source, the object can be underexposed or completely dark. As described, when the object is backlight-photographed by the camera of the mobile phone, the user generally changes their position and photographs the object, or just photographs without compensating for backlight with the outcome of a photograph with a dark subject.

SUMMARY OF THE INVENTION

Accordingly, the present invention has been made to solve the above-mentioned problems occurring in the prior art. A first object of the present invention is to provide an apparatus and a method for automatically compensating for backlight in a camera of a mobile terminal when an object is backlight-photographed by a camera.

A second object of the present invention is to provide an apparatus and a method for measuring backlight associated with a camera of a mobile terminal having a camera lens and an ultraviolet sensor, which are disposed adjacent to each other and oriented in one direction and incorporated in one module.

In order to accomplish the aforementioned objects, according to one aspect of the present invention, there is provided an apparatus for compensating for backlight in a mobile terminal with a camera comprising a camera unit having a camera lens and an ultraviolet sensor, which are disposed adjacent to each other and oriented in the same direction; and a control unit for generating a photographing control signal when a photographing mode key is input and controlling compensation for backlight in the photographing mode.

In order to accomplish the aforementioned objects, according to one aspect of the present invention, a method for compensating for backlight in a mobile terminal including a camera unit having a camera lens and an ultraviolet sensor disposed adjacent to the camera lens and oriented in the same direction as the camera lens is provided. The method comprises the steps of measuring ultraviolet light while in a photographing mode; determining whether there is significant backlight according to a result of the measurement of the ultraviolet light; and photographing an object while automatically flashing a flash when there is significant backlight.

In order to accomplish the aforementioned objects, according to one aspect of the present, a method for compensating for backlight in a mobile terminal including a camera unit having a camera lens and an ultraviolet sensor disposed adjacent to the camera lens and oriented in the same direction as the camera lens is provided. The method comprises the steps of measuring ultraviolet light while in a photographing mode; determining whether there is significant backlight according to a result of the measurement of the ultraviolet light; and photographing the object while automatically compensating for brightness when there is significant backlight.

In order to accomplish the aforementioned objects, according to one aspect of the present, a method for compensating for backlight in a mobile terminal including a camera unit having a camera lens and an ultraviolet sensor disposed adjacent to the camera lens and oriented in the same direction as the camera lens is provided. The method comprises the steps of measuring ultraviolet light while in a photographing mode; determining whether there is significant backlight according to a result of the measurement of the ultraviolet light; and displaying a message which represents an inability to photograph when there is significant backlight.

In order to accomplish the aforementioned objects, according to one aspect of the present, a method for compensating for backlight in a mobile terminal including a camera unit having a camera lens and an ultraviolet sensor disposed adjacent to the camera lens and oriented in the same direction as the camera lens is provided. The method comprises the steps of establishing a compensation method of photographing with backlight; measuring ultraviolet light while in a photographing mode to determine whether there is significant backlight; photographing an object while automatically flashing a flash according to the established compensation method of photographing with backlight when there is significant backlight; photographing the object while automatically compensating for brightness according to the established compensation method of photographing with backlight when there is significant backlight; and displaying a message which represents an inability to photograph with backlight when there is significant backlight.

BRIEF DESCRIPTION OF THE DRAWINGS

The above and other objects, features and advantages of the present invention will be more apparent from the following detailed description taken in conjunction with the accompanying drawings, in which.

It should be understood that in the drawings, like reference numbers refer to like features and structures.

DETAILED DESCRIPTION OF THE PREFERRED EMBODIMENTS

Embodiments of the present invention will now be described with reference to the accompanying drawings. In the following description, specific details such as an installation position of an ultraviolet sensor, a measured numerical value of ultraviolet light, a brightness adjustment step, a reference value for determining whether there is significant backlight are provided for illustrative purposes. Further, it should be understood by those skilled in the art that the present invention may be practiced without the specific details or with modification to the specific details.

Figure 1:
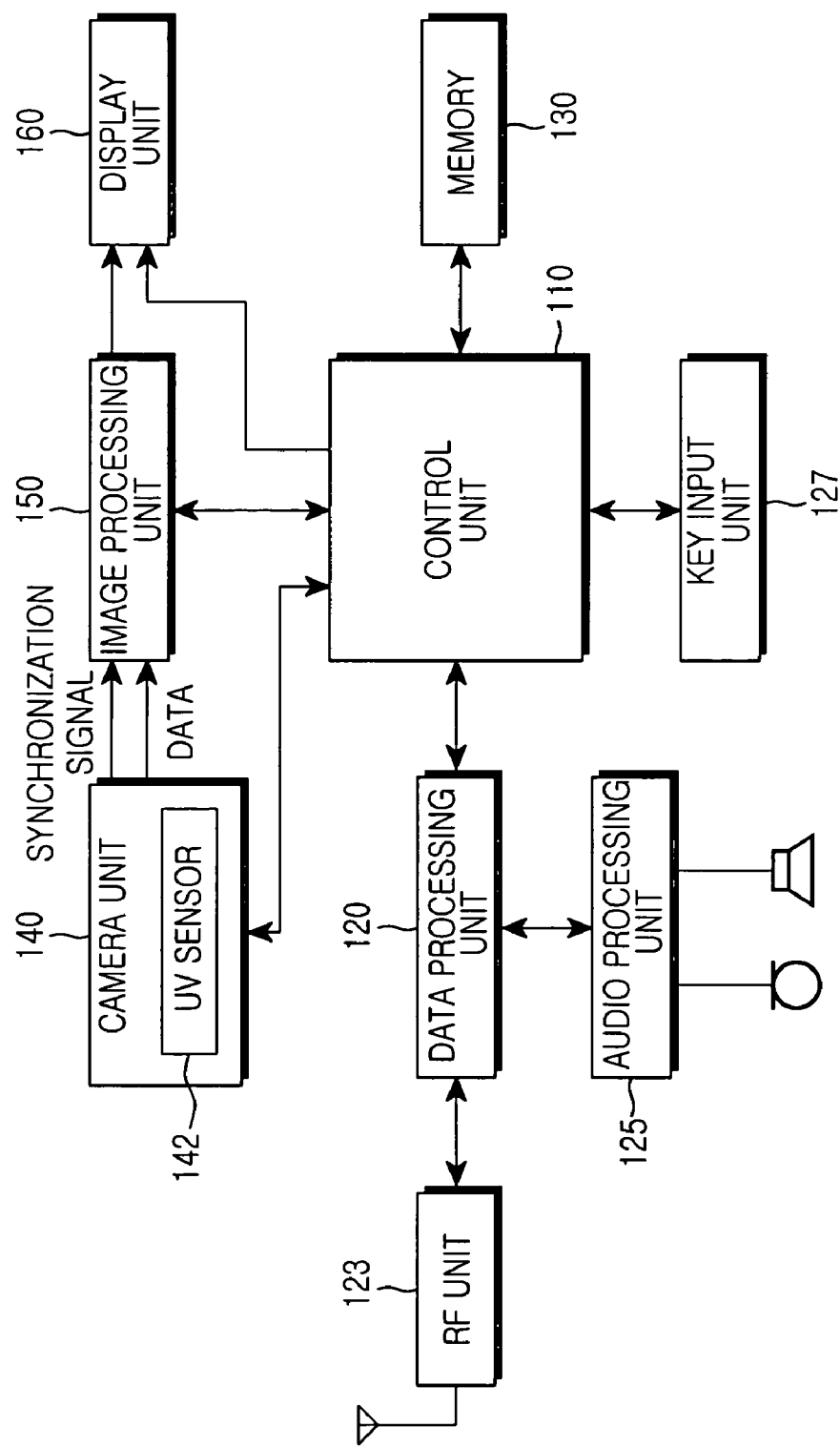
FIG. 1 is a block diagram showing a construction of a mobile terminal according to an embodiment of the present invention.

FIG. 1 is a block diagram showing a construction of a mobile terminal with a camera according to an embodiment of the present invention.

Referring to FIG. 1, a radio frequency (RF) unit 123 performs wireless communication functions, and includes an RF transmitter (not shown) for transforming a frequency of a transmitted signal into a high frequency signal and amplifying the transformed frequency signal, and an RF receiver (not shown) for low-noise amplifying a received signal and transforming the frequency of the amplified signal into a low frequency signal. A data processing unit 120 includes a transmitter (not shown) for coding and modulating the transmitted signal, and a receiver (not shown) for demodulating and decoding the received signal. That is, the data processing unit 120 may include a modem and a codec. Herein, the codec includes a data codec for processing packet data, and so on, and an audio codec for processing an audio signal such as a voice signal. An audio processing unit 125 reproduces the audio signal output from the audio codec of the data processing unit 120, or transmits an audio signal generated in a microphone to the audio codec of the data processing unit 120.

A memory 130 may include program memories and data memories. The program memory may store programs for controlling a general operation of the mobile terminal and control programs for compensating for photographing with backlight according to a measured numerical value of ultraviolet light in an embodiment of the present invention. Further, the data memory temporarily stores data generated while the programs are performed. The memory 130 may store an ultraviolet value measured by an ultraviolet sensor 142 according to an embodiment of the present invention, and a reference value for determining that there is significant backlight. Also, the memory 130 may store image data photographed according to an embodiment of the present invention.

A control unit 110 controls a general operation of the mobile terminal and may include the data processing unit 120. Further, the control unit 110 controls an ultraviolet value to be measured in a photographing mode according to an embodiment of the present invention, and compares the measured data with the reference value in order to compensate for the photographing with backlight.

The camera unit 140 photographs image data through a camera lens, and includes a camera sensor for converting a photographed optical signal into an electrical signal and a signal processor for converting an analog image signal photographed from the camera sensor into digital data. Herein, it is assumed that the camera sensor is a charge coupled device (CCD) sensor, and the signal processor may include a digital signal processor (DSP). Further, the camera sensor may be integrated with the signal processor, or vice versa. In the present invention, the signal processor may adjust a brightness of photographed data when determining that there is significant backlight. Also, the camera unit 140 includes the ultraviolet sensor 142 for detecting the intensity and amount of ultraviolet light to output current proportional to the detected intensity of the ultraviolet light, and it is installed at the same position as that of the camera lens.

Figure 2A:
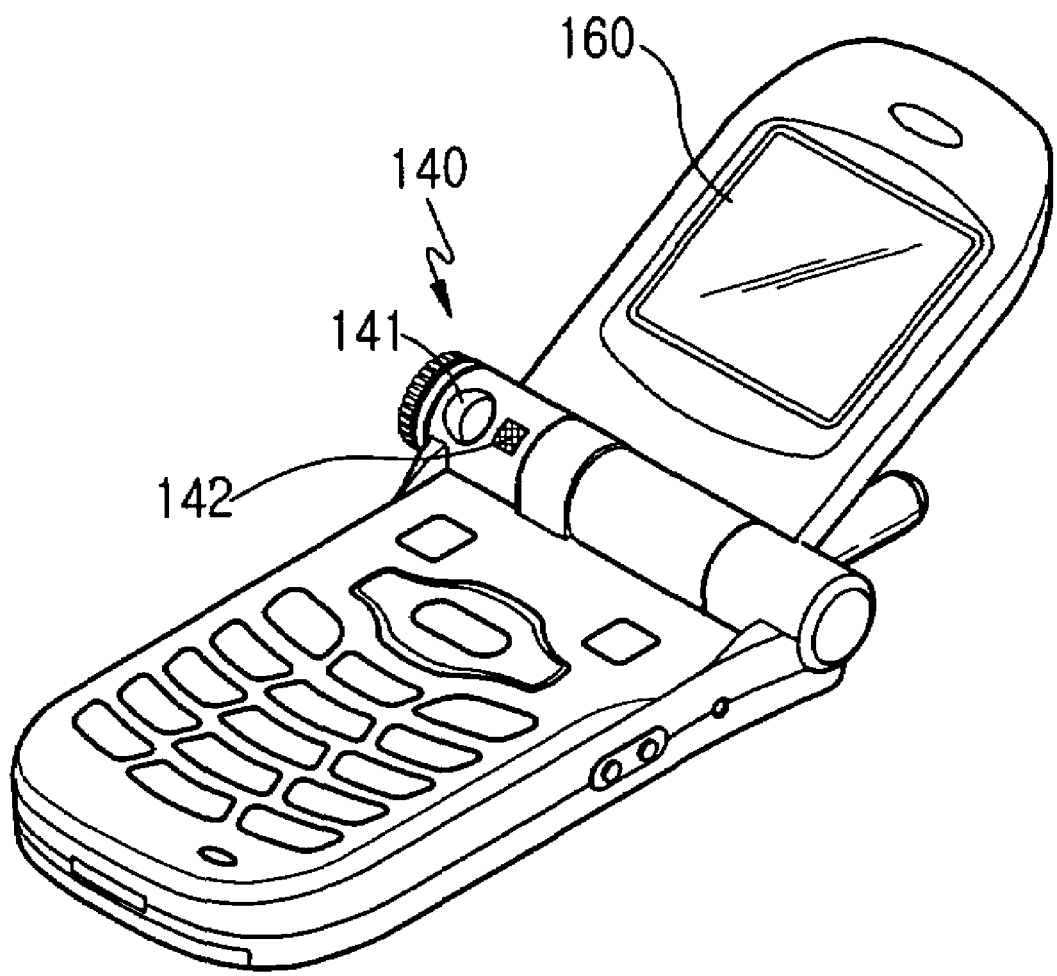
FIGS. 2A through 2C are perspective views of mobile terminals including a camera unit according to an embodiment of the present invention.
Figure 2B:
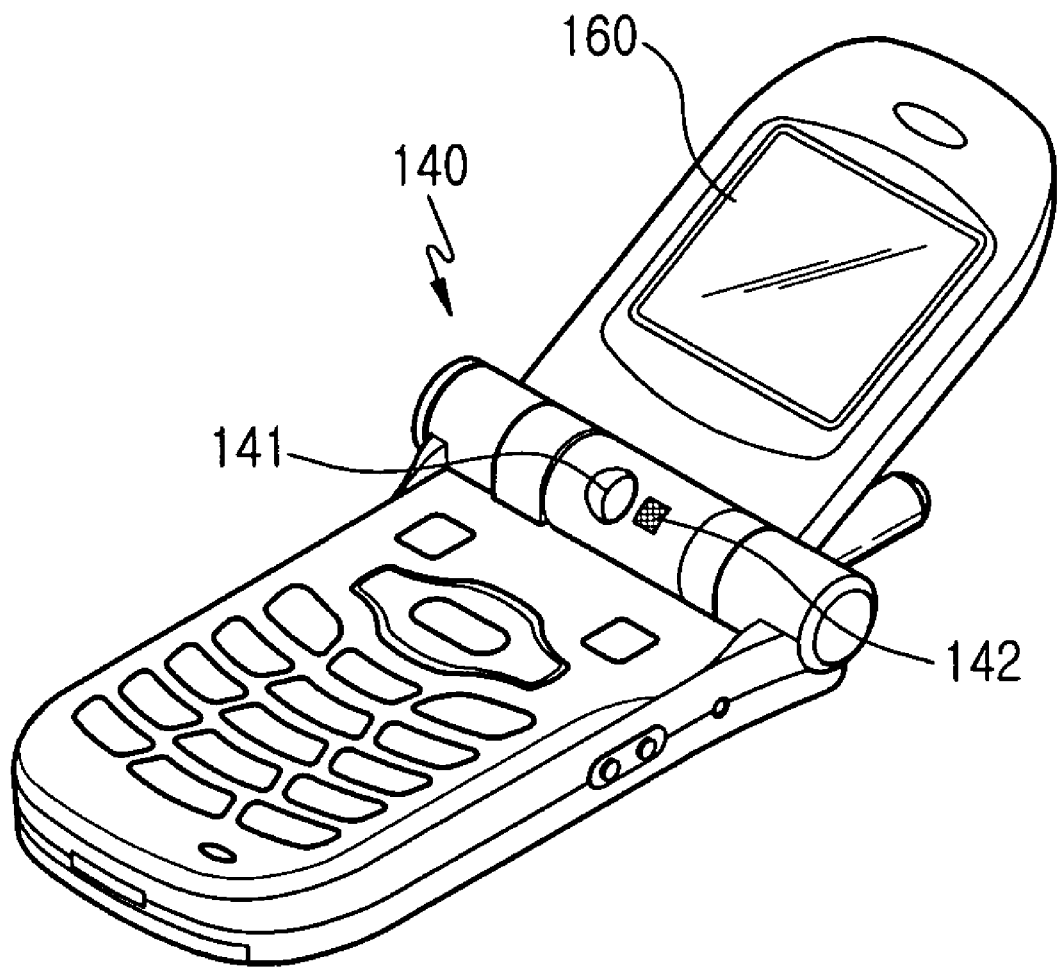
Figure 2C:
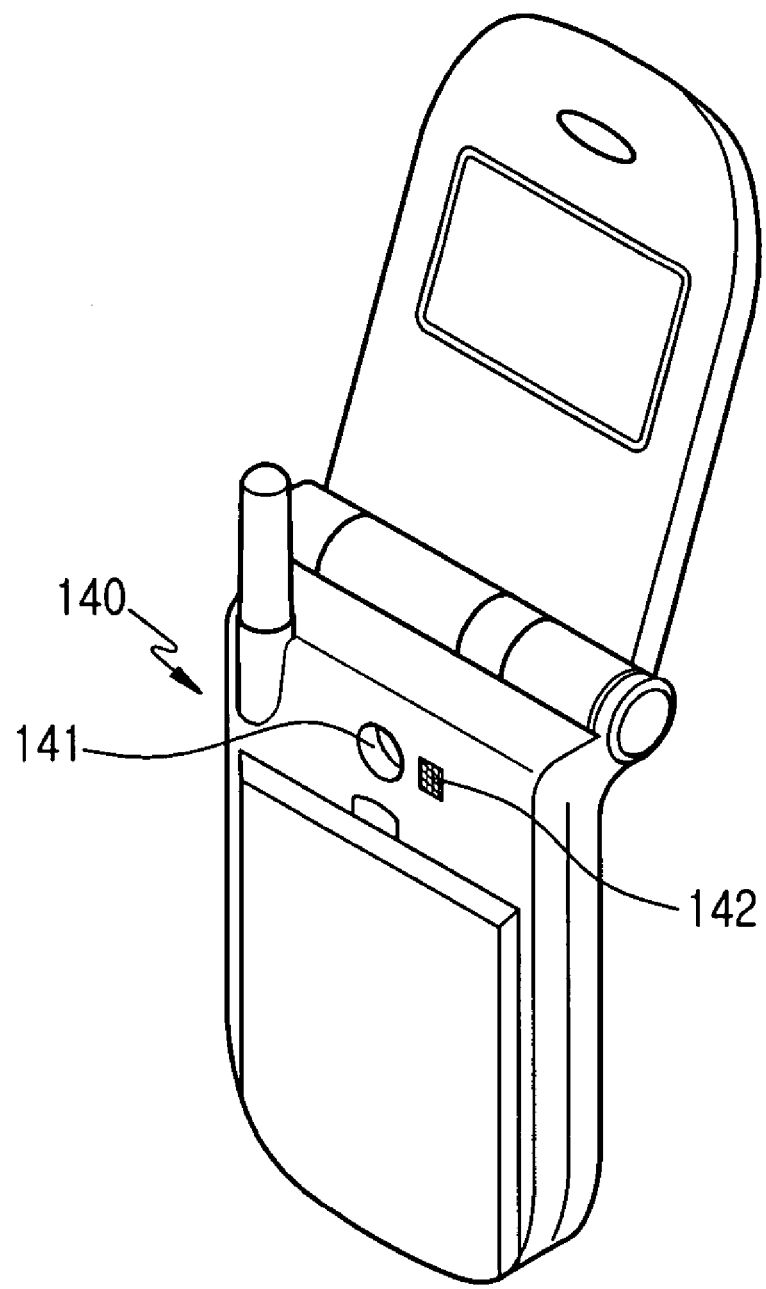

FIGS. 2A through 2C are perspective views of mobile terminals having the camera unit 140 in which the camera lens and the ultraviolet sensor are packaged in one module. FIG. 2A shows a version in which the camera unit 140 is mounted on one side of a hinge of the mobile terminal so that the camera unit 140 can rotate 360°. FIG. 2B shows a version in which the camera unit 140 is mounted on a central portion of the hinge of the mobile terminal, and FIG. 2C shows a version in which the camera unit 140 is mounted at the back of the mobile terminal so that the camera unit 140 can rotate up to 30° upward and up to 30° downward. As described above, the ultraviolet sensor 142, which is disposed adjacent to the camera lens 141 and oriented in the same direction as the camera lens 141, may measure the same ultraviolet light input in the camera lens 141 regardless of the type of mobile terminal used or an installation position of the camera unit 140. FIGS. 2A through 2C show a version in which the ultraviolet sensor 142 is installed on a right side of the camera lens 141, but it should be understood that the ultraviolet sensor 142 may be installed at an upper side, a lower side, or a left side of the camera lens 141.

Referring now to FIG. 1, an image processing unit 150 generates screen data for displaying an image signal output from the camera unit 140, processes the image signal, which is output from the camera unit 140, by the frame, and outputs frame image data according to a characteristic and size of a display unit 160. Further, the image processing unit 150 includes an image codec, compresses the frame image data displayed in display unit 160 by a predetermined method, or restores the compressed frame image data into original frame image data. Herein, the image codec may include a Joint Photographic Experts Group (JPEG) codec, a Moving Pictures Experts Group 4 (MPEG4) codec, or a wavelet codec, among others. It is assumed that the image processing unit 150 includes on screen display (OSD) function, and it may output OSD data according to the size of a displayed screen under the control of the control unit 110.

The display unit 160 displays the image signal, which is output from the image processing unit 150, on a screen, and displays user data output from the control unit 110. Herein, the display unit 160 may use a liquid crystal display (LCD), and may include an LCD controller, a memory capable of storing image data, and an LCD device, among others. Herein, when the LCD employs a touch screen type, it may operate as an input unit. A key input unit 127 includes keys for inputting numeral and text information and function keys for setting various functions. The display unit 160 may display a photographing screen in which the photographing with backlight is compensated according to an embodiment of the present invention.

Hereinafter, an operation of the mobile terminal will be described with reference to FIG. 1. After a user performs a dialing operation through the key input unit 127 when the terminal is called, when the user sets a calling mode, the control unit 110 detects the calling mode, processes dial information received through the data processing unit 120, converts the processed dial information into an RF signal through the RF unit 123, and outputs the converted RF signal. Then, when a receiving side generates a response signal, the control unit 110 detects the response signal through the RF unit 123 and the data processing unit 120. Then, a voice communication path is established through the audio processing unit 125, and the user performs a communication function. Further, in a receiving mode, the control unit 110 detects the called mode through the data processing unit 120 and generates a ring signal through the audio processing unit 125. Then, when the user responds, the control unit 110 detects the response. Further, a voice communication path is established through the audio processing unit 125, and the user performs a communication function. In the calling and called mode, a voice communication has been described as an example. However, besides voice communication, a data communication function for communicating packet data and image data may be performed. Further, when a standby mode or a text communication is performed, the control unit 110 displays text data processed by the data processing unit 120 on the display 160.

Figure 3:
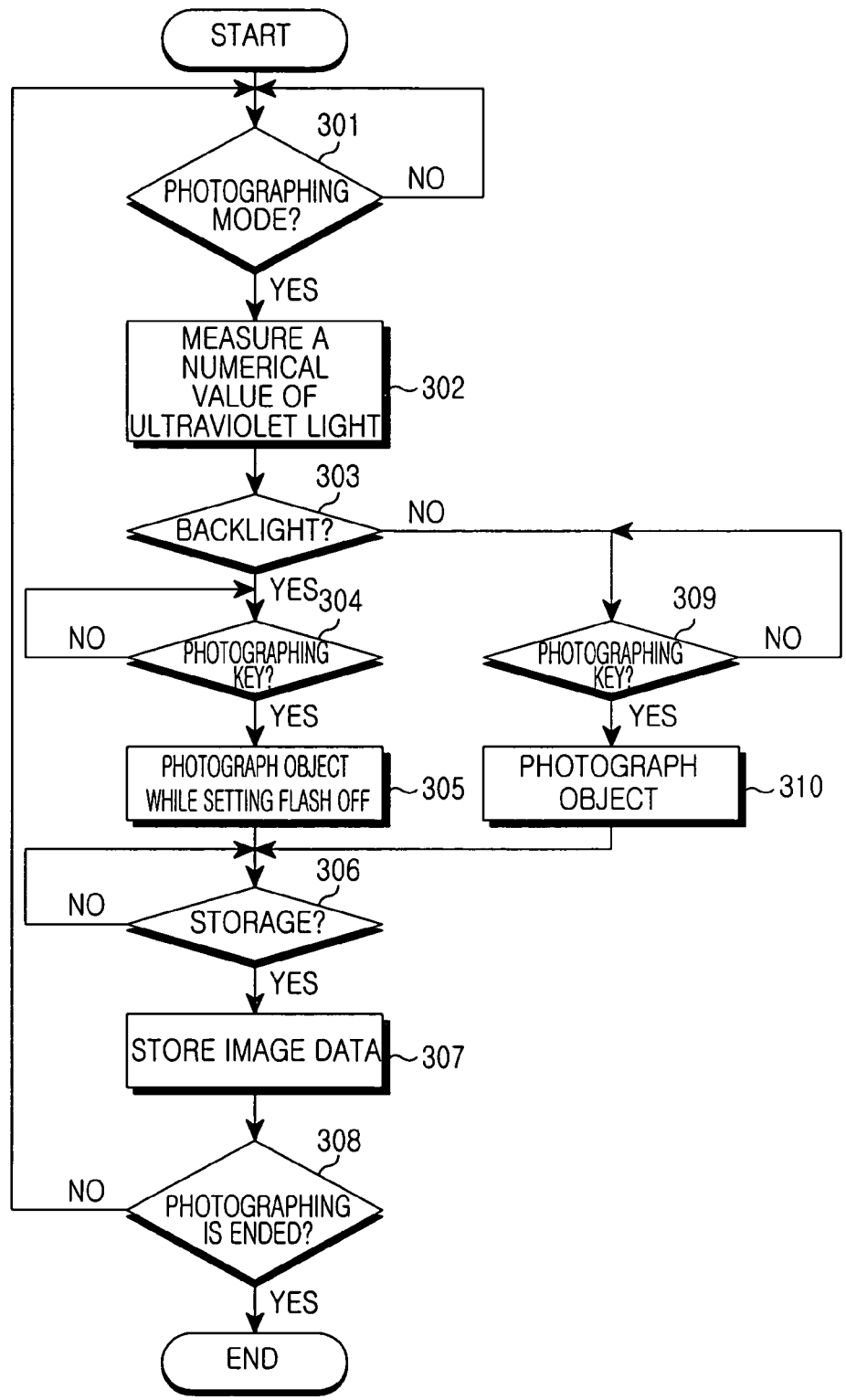
FIG. 3 is a flowchart illustrating a method of compensating for backlight in a mobile terminal according to a first embodiment of the present invention.

FIG. 3 is a flowchart of a method according to a first embodiment of the present invention, in which backlight into a camera in a mobile terminal is compensated for by flashing a flash of the camera. The following description refers to an exemplary mobile terminal similar to the one shown in FIG. 2A, in which a camera unit including a camera lens and an ultraviolet sensor disposed at a right side of the camera lens is installed at one side of a hinge of the mobile terminal so that the camera unit can rotate 360°.

Hereinafter, an embodiment of the present invention will be described in detail with reference to FIG. 1, FIG. 2A, and FIGS. 6 to 9. Referring to FIG. 3, when a user photographs an object and wants to display the photographed subject on the display unit 160, the user generates key data for driving the camera unit 140 through the key input unit 127. Herein, a key for driving a photographing mode may be located on a navigation key of the key input unit 127, or the key is displayed as a menu by means of a menu key and the displayed menu may be selected. When the photographing mode is selected as described above, the control unit 110 detects the photographing mode in step 301.

Further, the control unit 110 controls the signal processor and the image processing unit 150 to activate a path through which a photographed image signal may be received, and controls the signal processor to receives an image signal representing the object photographed by the camera unit 140. Herein, the control unit 110 controls the ultraviolet sensor 142 to measure a numerical value of ultraviolet light in step 302, and compares the measured value of the ultraviolet light with the reference value stored in the memory 130. As a result of the comparison, when the measured data value is smaller than the reference value, the control unit 110 determines that the backlight is not significant in step 303, and detects an input of a photographing key in step 309 when the user presses the photographing key. Then, photographing the object is performed in step 310.

When the measured data value is larger than the reference value, the control unit 110 determines that the backlight is significant in step 303. Then, when the user presses the photographing key, the control unit 110 detects the in put of the photographing key in step 304. Then, step 305 of flashing a flash and photographing the object is performed. Typically, when photographing is performed when the flash flashes and the backlight is significant, the object becomes bright. In step 305, the flash may be set to flash automatically under the control of the control unit 110, or the flash may be manually operated by a key operation of the user after the control unit 110 displays a message indicating that the backlight is not significant.

Figure 6A:
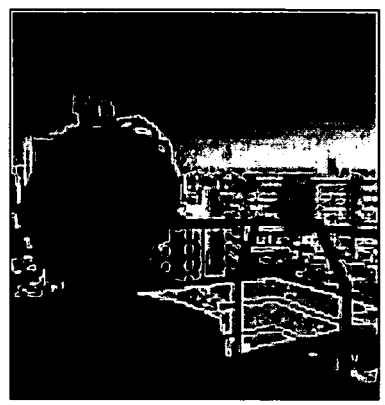
FIGS. 6A through 6C are images illustrating different backlight conditions according to FIG. 3 or FIG. 4.
Figure 6B:
Figure 7A:
FIGS. 7A and 7B are images illustrating different backlight conditions according to FIG. 3.
Figure 7B:
Figure 8A:
FIGS. 8A and 8B are images illustrating different backlight conditions according to FIG. 3.
Figure 8B:
Figure 9A:
FIGS. 9A and 9B are images illustrating different backlight conditions according to FIG. 3.
Figure 9B:

FIG. 6A shows a screen photographed with significant backlight by the mobile terminal when a numerical value of ultraviolet light is 640 $\mu W/cm^2$. In a state in which the reference value of the photographing with backlight is 100 $\mu W/cm^2$, when the image screen as shown in FIG. 6A is photographed, the control unit 110 compares the measured numerical value (640 $\mu W/cm^2$) of the ultraviolet light with the reference value (100 $\mu W/cm^2$) and determines that the backlight is significant in step 303. Then, when the user presses the photographing key, the control unit 110 detects the input of the photographing key in step 304. Then, step 305 of flashing a flash and photographing the object is performed. FIG. 6B shows a scene from FIG. 6A, which is photographed after the flash flashes in step 305. FIG. 7A shows a screen backlight-photographed by the mobile terminal when the numerical value of the ultraviolet light is 210 $\mu W/cm^2$ and FIG. 7B shows the scene of FIG. 7A, which is photographed after the flash flashes in step 305. Further, FIG. 8A shows a screen backlight photographed by the mobile terminal when the numerical value of the ultraviolet light is 340 $\mu W/cm^2$ and FIG. 8B shows the scene from FIG. 8A, which is photographed after the flash goes off in step 305. FIG. 9A shows a screen photographed after the flash goes off when the numerical value of the ultraviolet light is 0 $\mu W/cm^2$ and FIG. 9B shows a scene photographed without setting the flash off when the numerical value of the ultraviolet light is 0 $\mu W/cm^2$. As described above, in the case of the interior of a room in which the numerical value of the ultraviolet light is 0 $\mu W/cm^2$, the control unit 110 determines that the backlight is not significant in step 303 and performs a general photographing function through steps 309 and 310.

If image data photographed as described above are displayed on the display unit 160, when the user requests storage of the image data, the control unit 110 detects the storage request in step 306 and stores the photographed image data in the memory 130 in step 307. When the photographing ends, the control unit 110 detects the end of the photographing period in step 308 and switches from a photographing mode into a communication mode.

Figure 4:
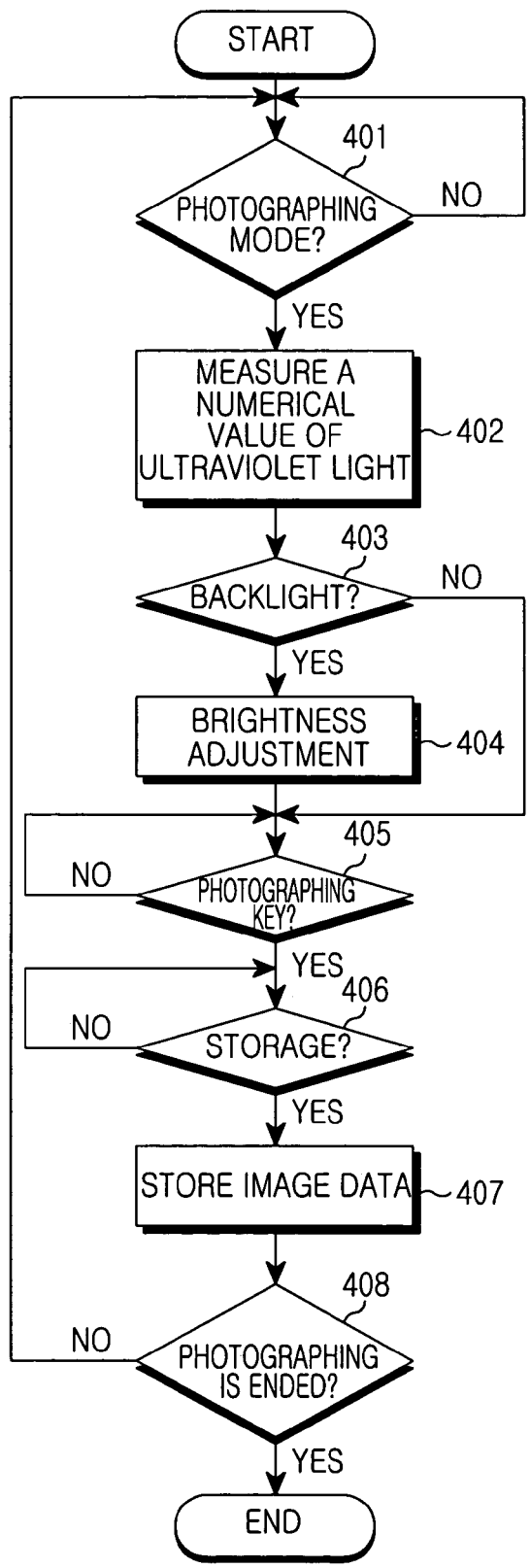
FIG. 4 is a flowchart illustrating a method of compensating for backlight in a mobile terminal according to a second embodiment of the present invention.

FIG. 4 is a flowchart illustrating a method of compensating for photographing with backlight by adjusting the brightness of a screen in a mobile terminal according to a second embodiment of the present invention. In the following description of an embodiment of the present invention an exemplary a mobile terminal similar to the one shown in FIG. 2A, in which a camera unit including a camera lens and an ultraviolet sensor disposed at a right side of the camera lens is installed at one side of a hinge of the mobile terminal so that the camera unit can rotate 360°.

Hereinafter, an embodiment of the present invention will be described in detail with reference to FIG. 1, FIG. 2A, and FIGS. 6A through 6C.

Referring to FIG. 4, when a user photographs an object and wants to display the photographed subject on the display unit 160, the user generates key data for driving the camera unit 140 through the key input unit 127. Herein, a key for driving a photographing mode may be located on a navigation key of the key input unit 127, or the key is displayed as a menu by means of a menu key and the displayed menu may be selected. When the photographing mode is selected as described above, the control unit 110 detects the photographing mode in step 401. Further, the control unit 110 controls the signal processor and the image processing unit 150 to activate a path through which a photographed image signal may be received, and controls the signal processor to receive an image signal representing the object photographed by the camera unit 140. Herein, the control unit 110 controls the ultraviolet sensor 142 to measure a numerical value of ultraviolet light in step 402, and compares the measured value of the ultraviolet light with the reference value stored in the memory 130. As a result of the comparison, when the measured data value is smaller than the reference value, the control unit 110 determines that the backlight is not significant in step 403, detects an input of a photographing in step 405 key when the user presses the photographing key, and photographs the object.

When the measured data value is larger than the reference value, the control unit 110 determines that the backlight is significant in step 403 and adjusts the brightness through the signal processor of the camera unit 140 in step 404. Generally, a brightness in a mobile terminal has between 10 and 30 steps. Accordingly, the signal processor may automatically adjust a brightness step of an image according to the reference value for determining whether significant backlight exists and the measured numerical value of the ultraviolet light, or may adjust the brightness by a control program set in advance.

Further, the signal processor may adjust not only the brightness of the screen but also a red emphasis and a contrast emphasis. The brightness adjustment in step 404 may be automatically performed under the control of the control unit 110 or may be manually adjusted by a key operation of the user after the control unit 110 displays a message reporting that the backlight is significant. After the brightness is adjusted in step 404, when the user presses a photographing key, the control unit 110 detects the input of the photographing key and photographs an object on a screen having adjusted brightness.

Figure 6C:

FIG. 6A shows a screen backlight photographed by the mobile terminal when a numerical value of ultraviolet light is 640 μW/cm². In a state in which the reference value for determining whether there is significant backlight is 100 μW/cm², when the image shown in FIG. 6a is photographed, the control unit 110 compares the measured numerical value (640 μW/cm²) of the ultraviolet light with the reference value (100 μW/cm²) and determines that the backlight is significant in step 403. Then, the control unit 110 controls the signal processor to adjust the brightness of the screen in step 404. FIG. 6C shows a screen in FIG. 6A, the brightness of which has been adjusted in step 404.

In a state in which image data photographed as described above are displayed on the display unit 160, when the user requests a storage of the image data, the control unit 110 detects the storage request in step 406 and stores the photographed image data in the memory 130 in step 407. When the photographing ends, the control unit 110 detects the end of the photographing in step 408 and switches from a photographing mode to a communication mode.

Figure 5:
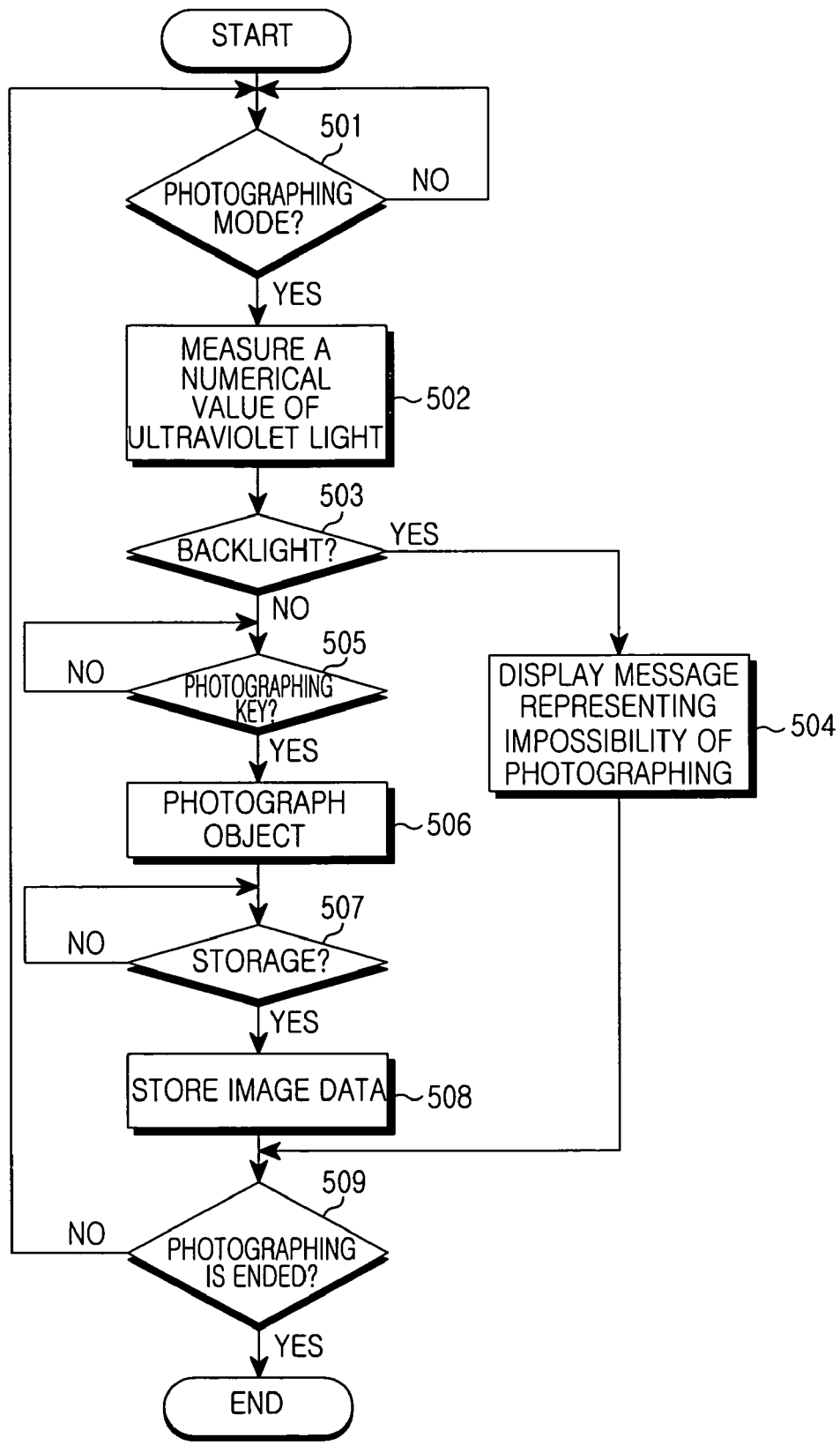
FIG. 5 is a flowchart illustrating a method of compensating for backlight in a mobile terminal according to a third embodiment of the present invention.

FIG. 5 is a flowchart illustrating a method of compensating for backlight in photographing with backlight in a mobile terminal according to a third embodiment of the present invention. In the following description of an embodiment of the present invention, an exemplary mobile terminal similar to that shown in FIG. 2A is disclosed, in which a camera unit including a camera lens and an ultraviolet sensor disposed at a right side of the camera lens is installed at one side of a hinge of the mobile terminal so that the camera unit can rotate 360°.

Hereinafter, an embodiment of the present invention will be described in detail with reference to FIG. 1 and FIG. 2A.

Referring to FIG. 5, when a user photographs an object and wants to display the photographed subject on the display unit 160, the user generates key data for driving the camera unit 140 through the key input unit 127. Herein, a key for driving a photographing mode may be located on a navigation key of the key input unit 127, or the key is displayed as a menu by means of a menu key and the displayed menu may be selected. When the photographing mode is selected as described above, the control unit 110 detects the photographing mode in step 501.

Further, the control unit 110 controls the signal processor and the image processing unit 150 to activate a path through which a photographed image signal may be received, and controls the signal processor to receives an image signal representing the object photographed by the camera unit 140. Herein, the control unit 110 controls the ultraviolet sensor 142 to measure a numerical value of ultraviolet light in step 502, and compares the measured value of the ultraviolet light with the reference value stored in the memory 130. As a result of the comparison, when the measured data value is smaller than the reference value, the control unit 110 determines that the backlight is not significant in step 503, and detects an input of a photographing key in step 505 when the user presses the photographing key. Then, photographing the object is performed is performed. If image data photographed as described above are displayed on the display unit 160, when the user requests storage of the image data, the control unit 110 detects the storage request in step 507 and stores the photographed image data in the memory 130 in step 508. When the measured data value of the ultraviolet light is larger than the reference value, the control unit 110 determines that the backlight is significant in step 503 and displays a message which represents the difficulty of photographing on the display 160 in step 504. Herein, the mobile terminal may selectively perform a photographing function. When the photographing by the user is ended, the control unit 110 detects the ending of the photographing in step 509 and switches from a photographing mode to a communication mode.

Each method for compensating for the backlight in FIGS. 3 to 5 may be selectively set on a menu and used.

Accordingly, in an embodiment of the present invention, a camera lens and an ultraviolet sensor are disposed adjacent to each other, oriented in the same direction and incorporated in one module in a mobile terminal with a camera, so that backlight incident to a camera of the mobile terminal may be precisely compensated for. Further, in embodiments of the present invention, backlight incident to the camera of the mobile terminal may be automatically compensated for, so that the mobile terminal may be conveniently used.

While the invention has been shown and described with reference to certain embodiments thereof, it will be understood by those skilled in the art that various changes in form and details may be made therein without departing from the spirit and scope of the invention as defined by the appended claims.

What is claimed is:

1. An apparatus for compensating for backlight in a mobile terminal with a camera, the apparatus comprising:

a camera unit having a camera lens and an ultraviolet sensor which is disposed adjacent to the camera lens and oriented in the same direction as the camera lens in order to measure the same ultraviolet light input in the camera lens; and a control unit for generating a photographing control signal when a photographing mode key is input, determining that backlight is significant when a value of the ultraviolet light measured by the ultraviolet sensor is larger than a reference value in the photographing mode, and automatically flashing a flash or automatically adjusting a brightness upon input of a photographing key.

2. The apparatus as claimed in claim 1, wherein the camera unit converts an analog image signal photographed by the camera lens into digital data and includes a signal processor for compensating for brightness when there is significant backlight.

3. The apparatus as claimed in claim 1, wherein the ultraviolet sensor is installed at a left side or a right side of the camera lens.

4. The apparatus as claimed in claim 1, wherein the ultraviolet sensor is installed at an upper side or a lower side of the camera lens.

5. A method for compensating for backlight in a mobile terminal including a camera unit having a camera lens and an ultraviolet sensor disposed adjacent to the camera lens and oriented in the same direction as the camera lens in order to measure the same ultraviolet light input in the camera lens, the method comprising the steps of:

measuring ultraviolet light while in a photographing mode;

determining that there is significant backlight when a value of the ultraviolet light measured by the ultraviolet sensor is larger than a reference value; and compensating for backlight by photographing an object while automatically flashing a flash upon input of a photographing key when significant backlight is determined.

6. The method as claimed in claim 5, wherein, when there is significant backlight, the mobile terminal displays a message indicating that the backlight is significant and then comes into a state in which a user can photograph the object while manually flashing the flash.

7. A method for compensating for backlight in a mobile terminal including a camera unit having a camera lens and an ultraviolet sensor disposed adjacent to the camera lens and oriented in the same direction as the camera lens in order to measure the same ultraviolet light input in the camera lens, the method comprising the steps of:

measuring ultraviolet light while in a photographing mode;

determining that there is significant backlight when a value of the ultraviolet light measured by the ultraviolet sensor is larger than a reference value; and compensating for backlight by photographing the object while automatically compensating for brightness upon input of a photographing key when significant backlight is determined.

8. The method as claimed in claim 7, wherein, when there is significant backlight, the mobile terminal displays a message indicating that the backlight is significant and then comes into a state in which a user can photograph the object while manually compensating for brightness.

9. A method for compensating for backlight in a mobile terminal including a camera unit having a camera lens and an ultraviolet sensor disposed adjacent to the camera lens and oriented in the same direction as the camera lens in order to measure the same ultraviolet light input in the camera lens, the method comprising the steps of:

measuring ultraviolet light while in a photographing mode;

determining that there is significant backlight when a value of the ultraviolet light measured by the ultraviolet sensor is larger than a reference value; and displaying a message which represents a difficulty in photographing when there is significant backlight.

10. A method for compensating for backlight in a mobile terminal including a camera unit having a camera lens and an ultraviolet sensor disposed adjacent to the camera lens and oriented in the same direction as the camera lens in order to measure the same ultraviolet light input in the camera lens, the method comprising the steps of:

establishing a compensation method of photographing with backlight;

determining that there is significant backlight when a value of the ultraviolet light measured by the ultraviolet sensor is larger than a reference value in a photographing mode;

photographing an object while automatically flashing a flash according to the established compensation method of photographing with backlight upon input of a photographing key when there is significant backlight;

photographing the object while automatically compensating for brightness according to the established compensation method of photographing with backlight upon input of the photographing key when there is significant backlight; and displaying a message which represents a difficulty in photographing according to the established compensation method of photographing with backlight upon input of the photographing key when there is significant backlight.

* * * * *

UNITED STATES PATENT AND TRADEMARK OFFICE
CERTIFICATE OF CORRECTION

PATENT NO. : 7,576,785 B2
APPLICATION NO. : 10/847470
DATED : August 18, 2009
INVENTOR(S) : Jung et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1394 days.

Signed and Sealed this

Seventh Day of September, 2010

David J. Kappos
*Director of the United States Patent and Trademark Office*